United States Patent

Messier

[15] 3,717,403
[45] Feb. 20, 1973

[54] MITT MIRROR
[72] Inventor: Fernand A. Messier, P.O. Box 372, Spanish, Ontario, Canada
[22] Filed: March 10, 1971
[21] Appl. No.: 122,685

[30] Foreign Application Priority Data
Aug. 7, 1970 Canada..................090270

[52] U.S. Cl................................350/298, 224/28 G
[51] Int. Cl..............................................G02b 7/18
[58] Field of Search......350/298, 98; 224/28 R, 28 G

[56] References Cited

UNITED STATES PATENTS

| | | | |
|---|---|---|---|
| 1,499,175 | 6/1924 | Holquist | 350/298 |
| 1,139,560 | 5/1915 | Mosher | 350/298 |
| 1,309,150 | 7/1919 | Monfort | 350/298 |
| 1,823,814 | 9/1931 | Aiello | 350/298 X |
| 1,607,985 | 11/1926 | Johnson | 350/298 X |

FOREIGN PATENTS OR APPLICATIONS

| | | | |
|---|---|---|---|
| 345,766 | 4/1931 | Great Britain | 350/298 |

*Primary Examiner*—David Schonberg
*Assistant Examiner*—John W. Leonard
*Attorney*—Johnson, Marcus & Wray

[57] ABSTRACT

A rear-viewing mirror is provided which is adapted to be worn by the viewer. The mirror includes a base; a frame mounted on the base; and a mirror mounted in the frame. Apparel means, for example, a glove, or a mitt, or a band, or an elastic band, is secured to the base and is adapted to be worn by the user. This wearing is carried out in such a manner that the mirror is visible to the wearer.

5 Claims, 4 Drawing Figures

PATENTED FEB 20 1973

3,717,403

INVENTOR

BY Johnson, Marcus & Wray

ATTORNEY

MITT MIRROR

BACKGROUND OF THE INVENTION

1. Field of the Invention

This invention relates to a rear-viewing device. More particularly, it relates to a rear-viewing device or rear view mirror, adapted to be worn or associated with the hand or arm of the viewer.

2. Description of the Prior Art

There are many instances where it would be desirable for a rear-viewing mirror to be worn by, or associated with, the arm of the viewer. Examples of persons who desire such rear-viewing mirrors include snowmobile riders, bicycle riders, motorcycle riders, motor scooter riders, etc. To date, however, no satisfactory such rear-viewing mirror is readily available.

SUMMARY OF THE INVENTION

Aims of the Invention

An object, therefore, of a broad aspect of the present invention is to provide a rear-viewing mirror adapted to be associated by the viewer by being either worn on, or associated with, the arm of the viewer.

Statements of the Invention

By a broad aspect of this invention, a rear-viewing mirror is provided which is adapted to be worn by the viewer, the mirror comprising: a base; a frame mounted on the base; a mirror mounted in the frame; and apparel means secured to the base and adapted to be worn by the user in such a manner that the mirror is visible to the wearer of the apparel means.

By another embodiment of this invention, the means securing the frame to the base includes means adapted to permit the frame to be selectively disposed either in the vertical or in the horizontal plane.

Description of Other Embodiments

Many examples of apparel means are embraced within the ambit of this invention. One such means is a glove or mitt, whereby the base of the rear-viewing mirror is secured to the portion of the mitt which is adapted to cover the upper surface of the hand. Another example is a band, preferably an elastic band, to which the base is secured to that the mirror may be disposed at any position along the upper surface of the hand, wrist, or forearm.

The means to secure the mirror frame to the base to permit selective disposal of the mirror, either in a vertical or horizontal plane, can be an over-center hinge device in which the mirror frame would be urged to remain either in the horizontal or vertical plane but easily be moved either from the vertical plane or the horizontal plane.

DESCRIPTION OF PREFERRED EMBODIMENTS

DETAILED DESCRIPTION OF FIG. 1

Figure 1:
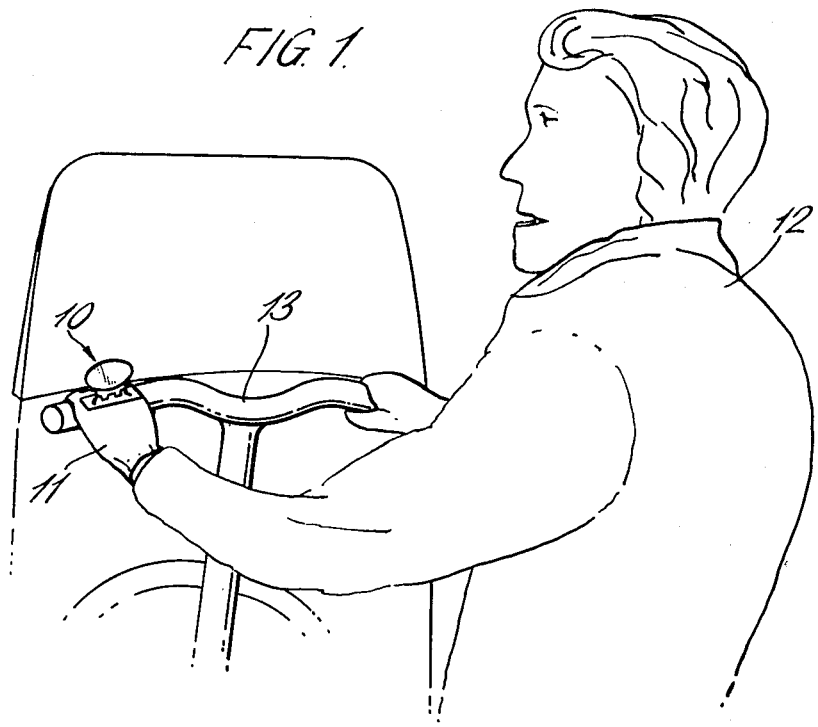
FIG. 1 is a perspective view of the rear-viewing mirror in one of its environmental uses.

Referring now to FIG. 1, it is seen that the rear-viewing mirror 10 of one aspect of the present invention is secured to a mitt 11 worn by an operator 12 of a snowmobile 13. Details of the rear-viewing mirror 10 are now provided with reference to FIGS. 2, 3 and 4.

DETAILED DESCRIPTION OF FIGS. 2, 3, AND 4

Figure 2:
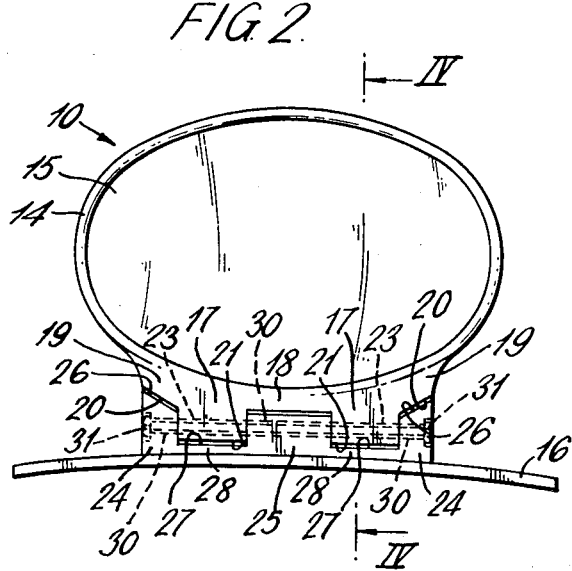
FIG. 2 is a front elevational view of the rear-viewing mirror.
Figure 3:
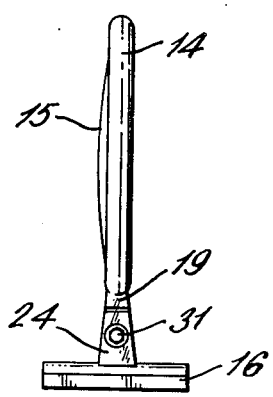
FIG 3 is a side elevational view of the rear-viewing mirror of FIG. 2.
Figure 4:
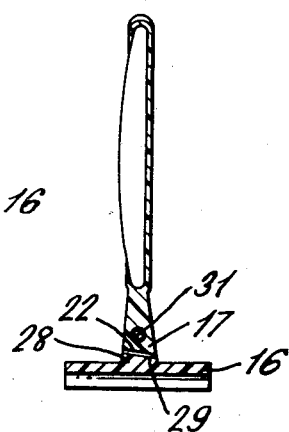
FIG. 4 is a cross-section along the line IV—IV of FIG. 2.

Turning now to FIGS. 2, 3, and 4, it is seen that the rear-viewing mirror 10 of this invention includes a frame 14 for a mirror 15, the frame being mounted on a base 16. The lower portion of the frame 14 is provided with a pair of downwardly depending legs 17 spaced apart by a center pedestal portion 18. The marginal pedestal portions 19 are provided with inwardly and downwardly projecting faces 20, when viewed from the front plane. Legs 17 are provided with flat bottom surfaces 21, when viewed from the front plane, the faces 21 being outwardly, downwardly sloping bottom faces 22, when viewed in cross-section as seen in FIG. 4. Legs 17 are also provided with transverse holes 23, for a purpose to be described hereinafter.

Base 16 is provided with a pair of spaced-apart upstanding lateral pedestals 24, and a central, upstanding pedestal 25. Downwardly depending legs 17 of frame 14 are adapted to be disposed between upwardly projecting pedestals 24 and 25 of base 16. The upper faces 26 of lateral pedestals 24 and 25 of base 16. The upper faces 26 of lateral pedestals 24 are each sloped downwardly and inwardly to coincide with the faces 20 of marginal pedestal portions 19 of frame 14. The faces 27 of the residual portions 28 of the base 16 are flat, when viewed in front elevation to coincide with the faces 21 of legs 17, but are outwardly, downwardly sloped at 29 to coincide with faces 22. Pedestals 24 and 25 are provided with apertures 30 extending therethrough, to be in registry with apertures 23 in legs 17.

ASSEMBLY OF THE EMBODIMENT OF FIGS. 2, 3 AND 4

To assemble the rear-viewing mirror, the frame 14 and the base 16 are brought into registry so that legs 17 are disposed between pedestals 24 and 25 and the holes 23 and 30 are in registry. A bolt and nut combination 31 is then passed through the registering holes 23, 30 to provide the necessary hinge structure. The base 16 is provided with suitable means, for example, apertures, so that it may be sewed, clipped, or buttoned to the upper face of a mitt. Alternatively, it may be glued to the mitt. It may also be secured, for example, to a band of elastic tape, or to any other apparel device. For example, any of the conventional watch straps or bands may be used to provide such connection.

USE OF THE EMBODIMENT OF FIGS. 2, 3 AND 4

In use, the rear-viewing mirror 10, if it is secured to a mitt, is worn by the user putting the mitt on his hand. If the rear-viewing mirror 10 is used for night-time driving and the lights of vehicles behind the snowmobile 13 cause a glare by reflection, the frame 14 may be urged away from the vertical position to the horizontal position by pushing the mirror against the handle bar of the snowmobile 13 or against the wearer's body.

From the foregoing description, one skilled in the art can easily ascertain the essential characteristics of this invention, and, without departing from the spirit and scope thereof, can make various changes and modifications of the invention to adapt it to various usages and conditions. Consequently, such changes and modifications are properly, equitably, and intended to be, within the full range of equivalence of the following claims.

I claim:

1. A rear view mirror adapted to be worn by a user and comprising:
   a. a base;
   b. a frame pivotally secured to said base for movement with respect thereto between a first, inoperative position in which it lies substantially parallel to said base, and a second, operative position in which it lies angularly displaced with respect to said first position;
   c. securing means selectively positively holding said frame in its respective first and second positions;
   d. a mirror mounted on said frame; and
   e. hand or wrist apparel means secured to said base.

2. The rear-viewing mirror of claim 1 wherein the securing means comprises an over-center hinge device including cooperating legs on the frame and pedestals on the base and a bolt passing through the registering apertures in the legs and pedestals to secure the frame to the base.

3. The rear-viewing mirror of claim 1 wherein the apparel mirror is a mitt or glove adapted to be worn by the user, the base being secured to the surface of the mitt adapted to be in contact with the upper surface of the wearer's hand.

4. The rear-viewing mirror of claim 3 wherein said first position and said second position are angularly displaced with respect to one another by an angle of substantially 90°.

5. The rear-viewing mirror of claim 3 wherein the securing means comprises an over-center hinge device including cooperating legs on the frame and pedestals on the base and a bolt passing through the registering apertures in the legs and pedestals to secure the frame to the base.

* * * * *